(Model.)

F. ECKSTEIN, Jr.
DRIVE CHAIN.

No. 391,591. Patented Oct. 23, 1888.

Witnesses:
W. C. Jirdinston.
James A. Ramsey.

Inventor:
Fred Eckstein Jr.
by his Attorneys.
Parkinson & Parkinson.

UNITED STATES PATENT OFFICE.

FRED. ECKSTEIN, JR., OF CINCINNATI, OHIO.

DRIVE-CHAIN.

SPECIFICATION forming part of Letters Patent No. 391,591, dated October 23, 1888.

Application filed July 12, 1886. Serial No. 207,772. (Model.)

*To all whom it may concern:*

Be it known that I, FRED. ECKSTEIN, Jr., a citizen of the United States, residing at Cincinnati, in the county of Hamilton and State of Ohio, have invented certain new and useful Improvements in Drive-Chains, of which the following is a specification.

My invention relates to that class of drive-chains composed of detachable links, and it relates more particularly to chains in which the links are so constructed and connected as to allow free and torsional play within all desirable range. The prototype of this class of chains may be found in Letters Patent No. 340,300, granted me April 20, 1886, wherein a detachable sprocket-link is provided at one end with a re-entrant spheroidal knob and at the opposite end with a grooved or cup-shaped hook adapted to receive and serve as a bearing for the knob of an adjacent link of like construction. In this former invention the knob or ball of one link can be inserted in the hook of another by a movement in a right line whenever the two links are brought to a certain angle; consequently, whenever restored to that angle the links may with equal facility become disengaged one from the other. The present improvement is a modification of the invention described and claimed in said Letters Patent; and it consists in a novel construction of the links, whereby the security of their engagement is greatly increased and the liability to become accidentally disengaged reduced to a minimum.

Figure 1:
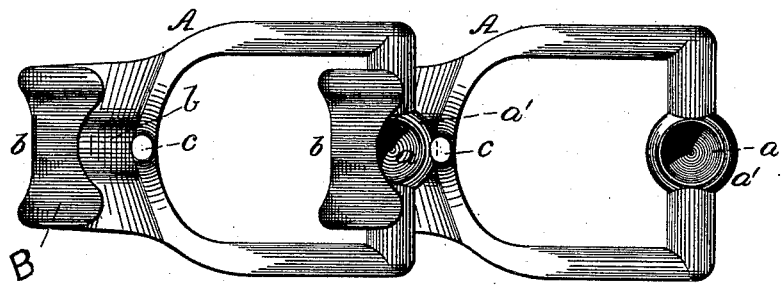
Figure 2:
Figure 3:
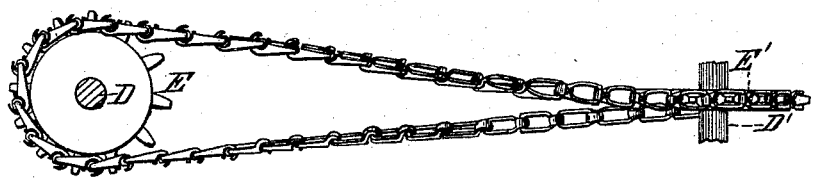

In the drawings, Figure 1 is a top plan view of two of the links coupled together. Fig. 2 is a sectional view on the line 2 2 of Fig. 1. Fig. 3 represents a drive-chain constructed in accordance with my invention applied to two sprocket-wheels turning in planes at right angles to each other.

A represents the link having side and end bars which afford a central sprocket-opening. One end of each link is formed by a bar having in one face a cupped notch or recess, $a$, preferably of conical shape. This end bar should be re-enforced at the notched part by an enlargement or knob, $a'$, preferably of spheroidal form, the notch in effect being in the back of the knob. At the end opposite the notch the side bars of the link merge into a hook, B, having a rounded channel or groove, $b$, upon its inner face, which is continued to the point, affording a concave surface adapted to receive and serve as a bearing for the spheroidal face of the knob upon the end bar of an adjacent link of like construction, and also preferably having a second exterior groove, $b'$, which serves as a bearing for the driving-tooth on the sprocket-wheel. Opposite the inner grooved portion at the end of the hook and upon the body part or adjacent end bar of the link is a lug, $c$, which extends upward toward said groove and partly closes the throat of the hook. The links are coupled by placing the second link in the relative position shown by dotted lines in Fig. 2, the cupped notch or recess in the end bar taking over the projecting lug in the throatway of the hook of another link, then swinging the second link into its normal position, which will release the lug from engagement with the notch and alternately bring the two links into line. A link cannot be uncoupled without turning it to an angle of considerably more than ninety degrees from its normal position relative to the adjacent links and bringing the lug into engagement with the cupped notch, and even when swung into the proper angle, while readily detached by design, it does not uncouple, unless the lug has engaged with the notch at the point of release, but swings past and is again locked against escape, and even if the lug has engaged a further intentional movement will be required to disengage it and completely release the link.

It will be seen that the convex face of the knob, seated in the concavity of the hook, will allow each link torsional play in every direction, thus securing a practically universal coupling, by which power may be transmitted to shafts at an angle to each other, or the direction of transmitted motion may be changed at will, as shown, for example, in Fig. 3, where D and D' are shafts at right angles to each other, and E and E' sprocket-wheels mounted upon said shafts and connected by means of a drive-chain embodying my invention.

I claim—

1. As an improvement in drive-chains, a detachable sprocket-link having at one end a knob in the back of which is a cupped notch or recess, and at the opposite end an internally-grooved hook adapted to receive and serve as a bearing for the knob of an adjacent link of like construction, and a lug or projection rising from the body part opposite the point of the hook and partly closing the throat thereof to engage with said notch.

2. As an improvement in drive-chains, a detachable sprocket-link having at one end a convex-faced knob containing a cupped notch or recess in its back, and at the opposite end a hook grooved in its outer and inner face, the inner groove forming a concave socket adapted to receive and serve as a bearing for the convex-faced knob of an adjacent link of like construction, and the outer groove serving as a guide and bearing for the sprocket-pins, said link being provided with a lug or projection opposite the point of the hook and which partly closes its throat.

3. The combination, to form a metallic chain flexible in all its axes, of a series of detachable links, each provided at one end with a convex-faced knob containing a cupped notch or recess and at the other end with an internally-grooved hook adapted to receive and serve as a bearing for the knob of an adjacent link, and having its throat partially closed by a lug which temporarily engages with the notch of the adjacent link and bars the accidental escape of said knob, substantially as described.

FRED. ECKSTEIN, Jr.

Witnesses:
SAML. S. CARPENTER,
JAMES N. RAMSEY.